United States Patent
Cohen et al.

(10) Patent No.: US 11,037,400 B2
(45) Date of Patent: Jun. 15, 2021

(54) METHODS AND APPARATUS FOR FACILITATING ONLINE SEARCH FOR UP-TO-DATE AVAILABLE SPORTS BETTING OPPORTUNITIES

(71) Applicant: IGT UK Interactive Limited, London (GB)

(72) Inventors: Charles Cohen, London (GB); Peter Russell, London (GB)

(73) Assignee: IGT UK Interactive Limited, London (GB)

( * ) Notice: Subject to any disclaimer, the term of this patent is extended or adjusted under 35 U.S.C. 154(b) by 601 days.

(21) Appl. No.: 14/856,987

(22) Filed: Sep. 17, 2015

(65) Prior Publication Data

US 2016/0086441 A1  Mar. 24, 2016

Related U.S. Application Data

(60) Provisional application No. 62/052,025, filed on Sep. 18, 2014.

(51) Int. Cl.
*G07F 17/32* (2006.01)
*G06F 16/9535* (2019.01)

(52) U.S. Cl.
CPC ...... *G07F 17/3237* (2013.01); *G06F 16/9535* (2019.01); *G07F 17/3288* (2013.01)

(58) Field of Classification Search
CPC ............. G07F 17/3237; G07F 17/3288; G06F 17/30867
USPC ...................................................... 700/91–93
See application file for complete search history.

(56) References Cited

U.S. PATENT DOCUMENTS

| | | | | |
|---|---|---|---|---|
| 6,371,855 B1* | 4/2002 | Gavriloff | ............... | A63F 13/12 463/42 |
| 6,669,565 B2* | 12/2003 | Liegey | .................... | A63F 3/081 463/1 |
| 7,001,279 B1* | 2/2006 | Barber | .............. | H04N 5/44513 348/E7.061 |
| 7,094,151 B2* | 8/2006 | Downes | ................. | G07F 17/32 463/25 |

(Continued)

OTHER PUBLICATIONS

"The Silicon Gaming Odyssey Slot Machine" (Levinthal, et al., 1063-6390/97, 1997, IEEE Xplore database).*

*Primary Examiner* — Omkar A Deodhar
*Assistant Examiner* — Matthew D Hoel
(74) *Attorney, Agent, or Firm* — Sage Patent Group (57) ABSTRACT

Techniques for facilitating online search for up-to-date available sports betting opportunities may include maintaining a history of sports betting performed by a user, and maintaining a data feed of available sports betting opportunities with continuous updates. A search query for available sports betting opportunities, input by the user, may be received at a first computing device from a second computing device over a network. Search results representing up-to-date available sports betting opportunities may be retrieved from the data feed at the first computing device in response to the input search query. At least a portion of the search results may be ranked based at least in part on the user's history of sports betting, and the ranked available sports betting opportunities may be transmitted from the first computing device to the user at the second computing device over the network as a response to the user's input search query.

20 Claims, 6 Drawing Sheets

(56) References Cited

U.S. PATENT DOCUMENTS

| | | | |
|---|---|---|---|
| 7,233,922 B2* | 6/2007 | Asher | G06Q 40/00 |
| | | | 705/36 R |
| 8,568,224 B1 | 10/2013 | Itkis et al. | |
| 8,777,737 B2 | 7/2014 | LeMay et al. | |
| 8,784,196 B2 | 7/2014 | Little et al. | |
| 9,358,462 B2* | 6/2016 | Hughes | A63F 13/828 |
| 2001/0041612 A1* | 11/2001 | Garahi | G07F 17/3288 |
| | | | 463/29 |
| 2002/0142816 A1* | 10/2002 | Stronach | G07F 17/3288 |
| | | | 463/6 |
| 2003/0054885 A1* | 3/2003 | Pinto | A63F 13/12 |
| | | | 463/42 |
| 2003/0199315 A1* | 10/2003 | Downes P. E. | G07F 17/3288 |
| | | | 463/28 |
| 2004/0009812 A1* | 1/2004 | Scott | G07F 17/32 |
| | | | 463/28 |
| 2004/0015429 A1* | 1/2004 | Tighe | G07F 17/3288 |
| | | | 705/37 |
| 2004/0110552 A1* | 6/2004 | Del Prado | A63F 13/12 |
| | | | 463/4 |
| 2004/0192437 A1* | 9/2004 | Amaitis | G07F 17/3288 |
| | | | 463/26 |
| 2005/0049731 A1* | 3/2005 | Dell | G07F 17/3288 |
| | | | 700/91 |
| 2005/0159220 A1* | 7/2005 | Wilson | A63F 13/12 |
| | | | 463/40 |
| 2005/0181869 A1* | 8/2005 | Downes P. E. | G07F 17/32 |
| | | | 463/28 |
| 2006/0040719 A1* | 2/2006 | Plimi | G07F 17/32 |
| | | | 463/9 |
| 2006/0064184 A1* | 3/2006 | Ream | G07F 17/32 |
| | | | 700/91 |
| 2006/0183547 A1* | 8/2006 | McMonigle | G07F 17/32 |
| | | | 463/40 |
| 2006/0211470 A1* | 9/2006 | Walker | G07F 17/3286 |
| | | | 463/16 |
| 2006/0252476 A1* | 11/2006 | Bahou | A63F 13/12 |
| | | | 463/4 |
| 2006/0258427 A1* | 11/2006 | Rowe | G07F 17/32 |
| | | | 463/16 |
| 2007/0055439 A1* | 3/2007 | Denker | G06Q 10/02 |
| | | | 701/532 |
| 2007/0055440 A1* | 3/2007 | Denker | G06F 16/9535 |
| | | | 701/532 |
| 2007/0060380 A1* | 3/2007 | McMonigle | G07F 17/32 |
| | | | 463/42 |
| 2007/0087821 A1* | 4/2007 | Lenti | G06Q 50/34 |
| | | | 463/25 |
| 2007/0243925 A1 | 10/2007 | LeMay et al. | |
| 2008/0076527 A1* | 3/2008 | Low | G07F 17/3244 |
| | | | 463/25 |
| 2008/0182651 A1* | 7/2008 | Marshall | G07F 17/3288 |
| | | | 463/25 |
| 2009/0054121 A1* | 2/2009 | Saito | G07F 17/32 |
| | | | 463/6 |
| 2011/0281620 A1* | 11/2011 | Hays | G07F 17/3288 |
| | | | 463/2 |
| 2012/0046094 A1 | 2/2012 | Shore et al. | |
| 2012/0142403 A1 | 6/2012 | Prather et al. | |
| 2013/0210510 A1 | 8/2013 | Mahaffey et al. | |

\* cited by examiner

METHODS AND APPARATUS FOR FACILITATING ONLINE SEARCH FOR UP-TO-DATE AVAILABLE SPORTS BETTING OPPORTUNITIES

CROSS-REFERENCE TO RELATED APPLICATIONS

This application claims a priority benefit under 35 U.S.C. § 119(e) to U.S. Provisional Application No. 62/052,025, filed Sep. 18, 2014, entitled "METHODS AND APPARATUS FOR DETERMINING AND PROVIDING BETTING OPTIONS TO A USER OF A NETWORKED SPORTSBOOK," which is hereby incorporated by reference herein in its entirety.

BACKGROUND

End users of computing devices connected to the internet can access other computing devices, such as servers, that are connected to the internet in order to provide a variety of services to the users. One such service is a sportsbook service that allows end users to place bets on a variety of events, such as sporting events. Users may place bets on the results of one or more sporting events or the performances of individuals within one or more sporting events. An online sportsbook typically provides a menu of betting options to end users, from which the end users select their bets.

As technology develops, the computing devices used by end users to access an online sportsbook have changed from desktop computers to mobile computing devices, such as laptops, tablets and mobile telephones.

SUMMARY

One type of embodiment is directed to a method of facilitating online search for up-to-date available sports betting opportunities, the method comprising: maintaining a history of sports betting performed by a user; maintaining a data feed of available sports betting opportunities with continuous updates; receiving, at a first computing device, a search query for available sports betting opportunities input by the user from a second computing device over a network; retrieving, at the first computing device, search results from the data feed representing up-to-date available sports betting opportunities in response to the input search query; ranking at least a portion of the search results representing available sports betting opportunities based at least in part on the user's history of sports betting; and transmitting the ranked available sports betting opportunities from the first computing device to the user at the second computing device over the network as a response to the user's input search query.

Another type of embodiment is directed to a method of displaying customized up-to-date available sports betting opportunities to a user, the method comprising: receiving, at a first computing device operated by the user, a list of up-to-date available sports betting opportunities ranked based at least in part on a history of sports betting performed by the user, transmitted to the first computing device over a network from a second computing device that maintains a data feed of available sports betting opportunities with continuous updates; and displaying the ranked available sports betting opportunities to the user at the first computing device in a cloud formation emphasizing available sports betting opportunities that are highly ranked based at least in part on the user's history of sports betting.

Another type of embodiment is directed to a system comprising at least one processor, and at least one storage medium storing processor-executable instructions that, when executed by the at least one processor, perform a method of facilitating online search for up-to-date available sports betting opportunities, the method comprising: maintaining a history of sports betting performed by a user; maintaining a data feed of available sports betting opportunities with continuous updates; receiving a search query for available sports betting opportunities input by the user from a client computing device over a network; retrieving search results from the data feed representing up-to-date available sports betting opportunities in response to the input search query; ranking at least a portion of the search results representing available sports betting opportunities based at least in part on the user's history of sports betting; and transmitting the ranked available sports betting opportunities to the user at the client computing device over the network as a response to the user's input search query.

Another type of embodiment is directed to a system comprising at least one processor, and at least one storage medium storing processor-executable instructions that, when executed by the at least one processor, perform a method of displaying customized up-to-date available sports betting opportunities to a user, the method comprising: receiving, at a first computing device operated by the user, a list of up-to-date available sports betting opportunities ranked based at least in part on a history of sports betting performed by the user, transmitted to the first computing device over a network from a second computing device that maintains a data feed of available sports betting opportunities with continuous updates; and displaying the ranked available sports betting opportunities to the user at the first computing device in a cloud formation emphasizing available sports betting opportunities that are highly ranked based at least in part on the user's history of sports betting.

Another type of embodiment is directed to at least one computer-readable storage medium storing computer-executable instructions that, when executed, perform a method of facilitating online search for up-to-date available sports betting opportunities, the method comprising: maintaining a history of sports betting performed by a user; maintaining a data feed of available sports betting opportunities with continuous updates; receiving, at a first computing device, a search query for available sports betting opportunities input by the user from a second computing device over a network; retrieving, at the first computing device, search results from the data feed representing up-to-date available sports betting opportunities in response to the input search query; ranking at least a portion of the search results representing available sports betting opportunities based at least in part on the user's history of sports betting; and transmitting the ranked available sports betting opportunities from the first computing device to the user at the second computing device over the network as a response to the user's input search query.

Another type of embodiment is directed to at least one computer-readable storage medium storing computer-executable instructions that, when executed, perform a method of displaying customized up-to-date available sports betting opportunities to a user, the method comprising: receiving, at a first computing device operated by the user, a list of up-to-date available sports betting opportunities ranked based at least in part on a history of sports betting performed by the user, transmitted to the first computing device over a network from a second computing device that maintains a data feed of available sports betting opportunities with continuous updates; and displaying the ranked available sports betting opportunities to the user at the first computing device in a cloud formation emphasizing available sports betting opportunities that are highly ranked based at least in part on the user's history of sports betting.

Another embodiment includes a method of providing customized bet options to a user of a networked sportsbook, the method comprising: receiving, at a first computing device, a request for customized bet options from a second computing device of the user; accessing a plurality of data feeds comprising a first data feed comprising public information, and a second data feed comprising private information; ranking at least a portion of all possible bet options based on the request and the plurality of data feeds such that the portion of all possible bet options is associated with a ranking value; and providing the customized bet options along with their associated ranking values to the computing device of the user.

According to another embodiment, the method further comprises displaying the customized bet options on a display device of the computing device based on the ranking values.

According to another embodiment, displaying the customized bet options on a display device of the computing device based on the ranking values comprises displaying a higher ranked bet option more prominently than at least one lower ranked bet option.

According to another embodiment, displaying a higher ranked bet option more prominently than at least one lower ranked bet option comprises displaying the higher ranked bet option closer to the top of a list of results displayed on the display device than the at least one lower ranked bet option.

According to another embodiment, displaying a higher ranked bet option more prominently than at least one lower ranked bet option comprises displaying the higher ranked bet option using a larger font size than the at least one lower ranked bet option.

According to another embodiment, the public information comprises event data selected from the group consisting of a name of an event, a starting time of an event, scoring statistics of an event, and an amount of time left in an event.

According to another embodiment, the public information is received from a third computing device that implements the sportsbook.

According to another embodiment, the private information comprises pricing data selected from the group consisting of odds for a particular bet, point-spread information, an amount of money already bet on each bet option, a weight of bets already taken on each bet option, and a maximum monetary value that may be bet.

According to another embodiment, the plurality of data feeds further comprises a third data feed comprising user information.

According to another embodiment, the user information comprises data selected from the group consisting of a bet-type history, a wager amount history, and a current location of the user.

According to another embodiment, the plurality of data feeds further comprises a fourth data feed comprising a risk profile associated with an operator of the networked sportsbook.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that while end users have been shifting to using mobile devices to access an online sportsbook, the manner in which the end users interact with the online sportsbook has not evolved to accommodate this shift. For example, the standard menu options that are provided to an end user may be difficult to navigate on mobile devices, such as mobile telephones. Finding a betting opportunity and placing a bet on a very specific and/or complicated outcome, such as a parlay involving multiple sporting events, can be quite difficult using a standard menu interface. To provide fast and efficient betting options to the end user, the inventors have recognized that it may be advantageous to implement a bet-ranking algorithm that incorporates a plurality of types of dynamic input in connection with a search function. In addition, the inventors have recognized and appreciated that the search results may advantageously be displayed to the user in a manner that emphasizes the top-matching results.

The inventors have also recognized and appreciated that, to ensure the bet-ranking engine implementing the bet-ranking algorithm is applicable to a variety of sportsbook implementations, the bet-ranking engine may be implemented on a separate computing device than the end user's computing device and the sportsbook server. This separate computing device may be a bet-ranking server that is a "middle man" in the communications between the end user's computing device and the sportsbook server.

In some embodiments, an online sportsbook allows a large variety of bets to be placed. A simple example of a bet is betting that Team A will beat Team B in a sporting event. In some embodiments, the sportsbook sets a point spread allowing an end user to bet that one of the teams will beat the point spread. As online communications have become fast and near real-time, the inventors have recognized that it is also possible for the online sportsbook to accept bets such as which player will score the next goal in an ongoing sporting event, how long it will be until someone scores a goal, how long until the next penalty and any number of other bets. In addition to single bets, the sportsbook may allow end users to place parlay bets or teaser bets, where the end user only wins if multiple individual bets are all winning bets. Parlay bets and teaser bets may be a combination of any number of individual bets from different, or the same, sporting events. In some embodiments, a parlay bet or a teaser bet may be a combination of betting on the winners of a plurality of different sporting events. In this way, an end user may bet on each of the teams that he or she supports in each of their respective sporting events. Accordingly, a supporter of the Boston Bruins, the Boston Celtics and the New England Patriots may bet that each of those teams will win in their next game. The end user only wins the parlay bet if each of the teams wins the next game. In some embodiments, parlay bets may also include multiple different bets associated with a single sporting event. For example, an end user may bet that the Boston Bruins will win their next game by two points and that player A will score one point, and player B will score two points. The end user only wins this parlay bet if all three individual bets are successful.

Figure 1:
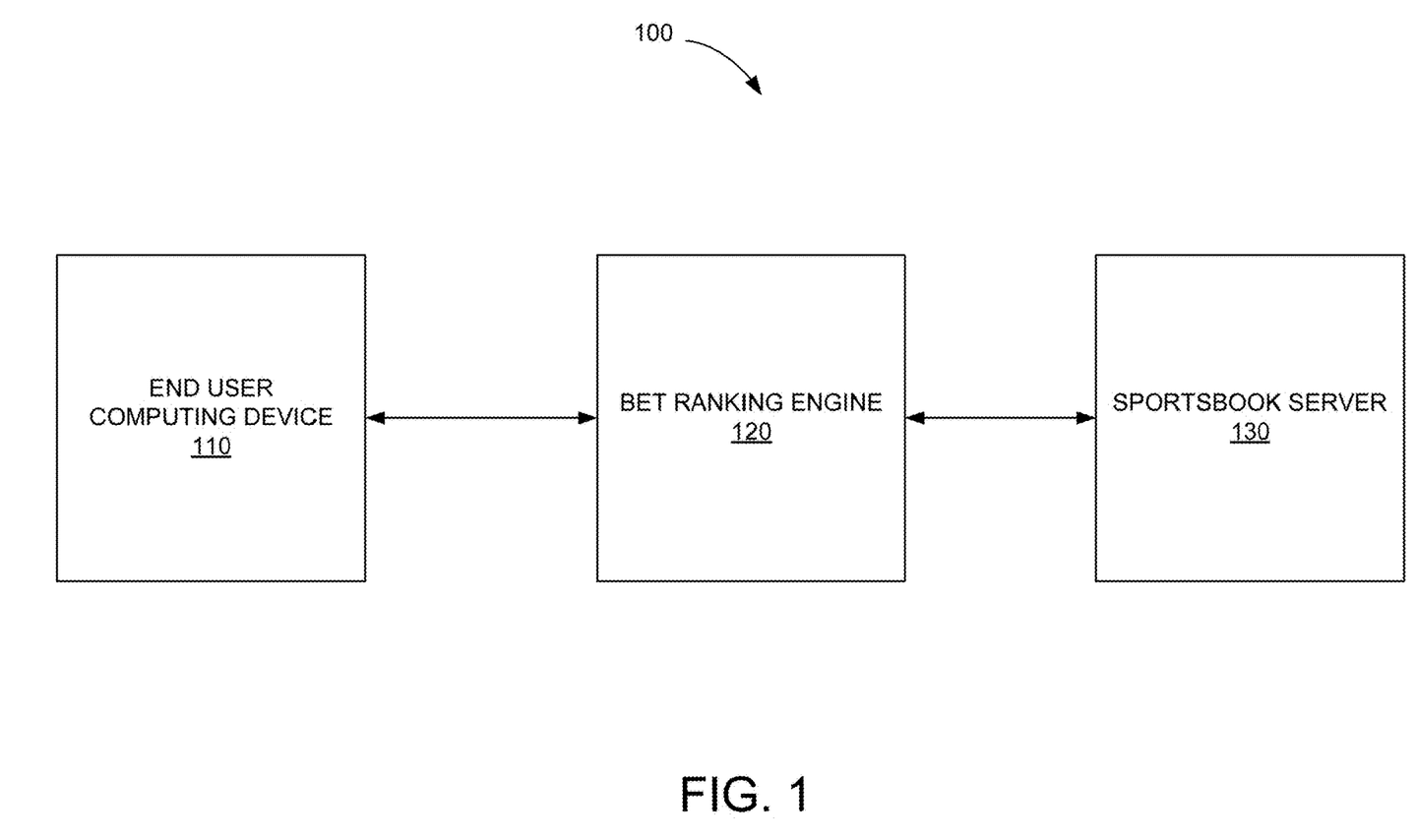
FIG. 1 is a block diagram of a network environment according to some embodiments.

The online sportsbook may be implemented in any suitable computing environment. FIG. 1 illustrates an example network environment 100 according to some embodiments. The network environment 100 includes an end user computing device 110, a bet-ranking engine 120 and a sportsbook server 130, each of which may be implemented using any suitable computing device, as described in connection with FIG. 6. While FIG. 1 illustrates three separate computing devices, some embodiments may include more devices or fewer devices. For example, in some embodiments, the sportsbook server 130 and the bet-ranking engine 120 may be implemented on the same computing device. In some embodiments, there may be a plurality of end user computing devices, each end user computing device being operated by a different end user.

In some embodiments, the end user computing device 110 may be a computing device operated by the end user to place bets, via a network (e.g., the internet), on sportsbook server 130. The end user computing device 110 may include at least one display device, for displaying betting options and other information, and may include at least one input device. The input device may be, by way of example and not limitation, a keyboard, a touchscreen, a microphone or any other suitable input device.

In some embodiments, the sportsbook server 130 may be a computing device that implements the online sportsbook. The sportsbook server 130 may calculate the odds and point spreads for all possible bets and may keep track of a wide range of private data used to implement the online sportsbook. For example, the sportsbook server 130 may track how many people have made a particular bet and how much money has been wagered on a particular bet. The sportsbook server 130 may also set a maximum and/or minimum wager amount for each possible bet. The information stored by the sportsbook server 130 may be stored in any suitable storage device(s). In some embodiments, the storage device(s) may be a part of the sportsbook server 130. In other embodiments, the storage device(s) may be separate from the sportsbook server 130 at a different physical location.

In some embodiments, the bet-ranking engine 120 may be a computing device that implements a bet-ranking algorithm for determining which betting options to present to the end user based on the end user's search. The bet-ranking engine 120 may be an intermediary between the end user computing device 110 and the sportsbook server 130. The end user computing device 110 may send and receive information to and from the bet-ranking engine 120. For example, a search query for available betting opportunities and/or a bet may be sent from the end user computing device 110 to the bet-ranking engine 120. The bet-ranking engine 120 may process at least a portion of the information and may communicate some or all of the information to the sportsbook server 130. Similarly, the sportsbook server 130 may send and receive information to and from the bet-ranking engine 120.

In some embodiments, the bet-ranking engine 120 may implement a bet-ranking algorithm to determine what results should be presented to the end user via the end user computing device 110. In some embodiments, the bet-ranking engine 120 may utilize both static and dynamic input data to rank the available betting opportunities for an end user. The input data may be received from any of a variety of sources. Some of the input data may be private data that is known to the operator of the sportsbook server 130 and the bet-ranking engine 120, but not known to the public. Some of the input data may be public data that is available to the public and is not private to the operator of the sportsbook server 130 and the bet-ranking engine 120. In some embodiments, at least a portion of the input data used by the bet-ranking engine 120 may be stored in a database that is frequently updated with real-time data. Any suitable database that is capable of handling large amounts of dynamic data may be used. Embodiments may, for example, use a NoSQL database, such as mongo or neo4j, and/or an SQL database, such as MySQL or Oracle.

The input data stored in the database and used by the bet-ranking engine may include a wide variety of input data to provide up-to-date, contextual results to the end user. In some embodiments, the input data may include event data, sportsbook data, end user history data and/or risk profile data. The event data may be public data about the sporting events on which an end user may place a bet. The event data may include static data such as the names of the sporting events, the names of the teams and/or players involved in each sporting event, the start time of each sporting event, etc. The event data may alternatively or additionally include dynamic data that is updated continuously (i.e., at least as frequently as every ten seconds, but preferably every 1-2 seconds or more frequently). The dynamic event data may include the current score in a sporting event, the amount of time left in a period of the sporting event, the names of players that have scored, the names of players that have been penalized, etc. Embodiments are not limited to the event data listed above as any suitable event data may be used.

The sportsbook data may be private data received from the sportsbook server 130. The sportsbook data may include the odds for individual bets, point spread information for sporting events that have a point spread, the number of bets placed by others on each betting opportunity, the amount of money currently wagered on each bet, the maximum amount of money that may be wagered on a single bet, the minimum amount of money that may be wagered on a single bet, etc. In some embodiments, the sportsbook data may be dynamic data that is updated continuously (i.e., at least as frequently as every ten seconds, but preferably every 1-2 seconds or more frequently). In some embodiments the sportsbook data stored in the database may be kept updated to reflect changes due to end users placing new bets.

The end user history data may be private data that reflects past actions made by the end user. Each end user of the online sportsbook may have his or her own associated end user history data. The end user history data may include dynamic data regarding previous searches made by the end user, previous bets placed by the end user, previous selections made by the end user on the end user computing device, etc. The end user history data may include names of teams, names of cities, names of sports, names of players and/or names of types of betting opportunities that have previously been searched for, selected and/or bet on by an end user. The end user history data may alternatively or additionally include static data from a user profile. The user profile may include, for example, age, gender, hometown, sports of interest, etc., as selected by the user, and/or any other information about the user.

The risk profile data may include information about the amount of risk the online sportsbook operator is willing to take. In some embodiments, this information may be distilled to a single, static numerical value representing the margin the operator expects to gain for each bet.

In some embodiments, the bet-ranking algorithm may use any or all of the above data to determine the most appropriate betting options to provide to the end user. One way in which the bet-ranking algorithm may be used is in response to search input received from the user. In some embodiments, the end user may input a search query (e.g., including search terms) into the end user computing device 110. This may be done via a keyboard, a touchscreen, a microphone, etc., connected to a processor capable of speech recognition. The search terms may be sent to the bet-ranking engine 120 as a search request, and the various input data may be weighted against the search terms to determine which betting options to provide to the end user. For example, the end user may input, via a keyboard, the first few letters of the word "Patriots," e.g., "PAT" and those letters may be sent to the bet-ranking engine 120 for analysis. Based on the input data from the database, different results may appear depending on external factors, such as the current time relative to various sporting events and what other end users are placing bets for, and/or the end user's history of interactions with the online sportsbook. By way of example, a first end user may be a New England Patriots fan who frequently bets on the winner of the Patriots game. The bet-ranking algorithm, using the end user history information, may rank betting opportunities related to the Patriots game high in the results and return those betting options to the first end user. A second end user may enter the same search term, e.g., "PAT," but not be a fan of the New England Patriots. Instead, the end user history data may show that the second user is a baseball fan and supports the San Francisco Giants. The event data may indicate that the Giants have a game later today against the Arizona Diamondbacks, who have a pitcher named Patrick Corbin. Accordingly, the bet-ranking algorithm may rank betting opportunities related to Patrick Corbin high in the ranking list so that, for example, the second end user can bet that Patrick Corbin will have 5 runs scored against him. In this way, each end user may be provided different results based on the same search terms based on the input data stored in the database used by the bet-ranking engine 120. In addition, within a particular user's results, certain betting options may be emphasized. For example, if a greater number of users are betting that the Patriots will lose, the bet-ranking algorithm may emphasize an opportunity to bet that the Patriots will win. The inventors have appreciated that this may benefit both the operator of the online sportsbook and the end user. By getting end users to even out the weight of the betting on either side, the operator may reduce its risk and, assuming the odds have also been adjusted to provide a higher payout if the Patriots win, then the end user may also benefit by being steered towards a bet that will result in a larger amount of proceeds if the bet is won.

Another way the bet-ranking algorithm may be used in some embodiments is in providing a "trend cloud" to the end user. Without needing to input any search terms, the bet-ranking engine 120 may send a plurality of betting options to the end user computing device 110 simply because the user connected to the online sportsbook via an internet browser or some other application, such as a mobile phone app. The betting options returned to the end user may be displayed on the end user computing device such that the top results are highlighted or emphasized in some way. For example, the top results may be listed in a more prominent location or may be displayed larger than the betting options that are not the top results.

The bet-ranking algorithm may aim to anticipate what the end user wants to bet on and rank relevant betting options. While strictly matching search terms to the universe of text-matching betting options is possible, the inventors have recognized that it may not be not sufficient. The universe of strictly matching search terms may be small. The bet-ranking algorithm may be capable of determining relevance in a more contextual way that does not depend on strict text-matching. For example, if an end user searches for "CUBS," search results related to the Chicago Cubs baseball game may be retrieved. But in some embodiments the bet-ranking algorithm may also return betting options related to the Chicago Bears based on the fact that other end users that are betting on the Cubs are also placing bets on the Bears.

Figure 2:
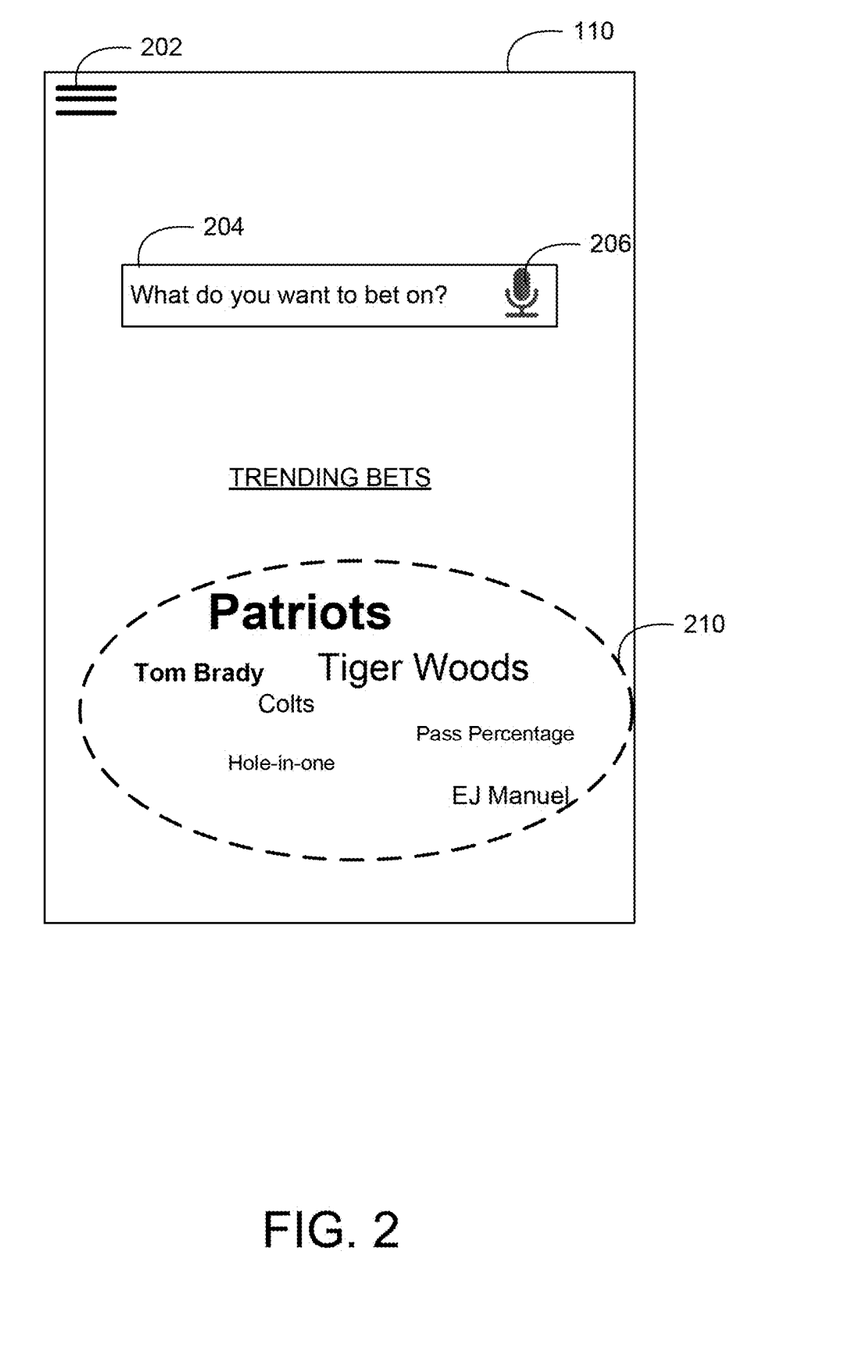
FIG. 2 is a schematic diagram of a graphical user interface according to some embodiments.

FIG. 2 illustrates an exemplary graphical user interface of the end user computing device 110 according to some embodiments. In this example, a menu button 202 is provided, which allows the user to access betting options via the standard menu listing. A search box 204 is provided to allow the end user to input a search term via a keyboard or a touch screen. A microphone button 206 is provided such that, when triggered by the end user, the end user computing device 110 will accept audio input from the end user. As discussed above, a trend cloud 210 provides the end user with betting options that are ranked high by the bet-ranking algorithm and may be of interest to the end user. In some embodiments, no search input is used to determine the betting options provided in the trend cloud 210.

Figure 3:
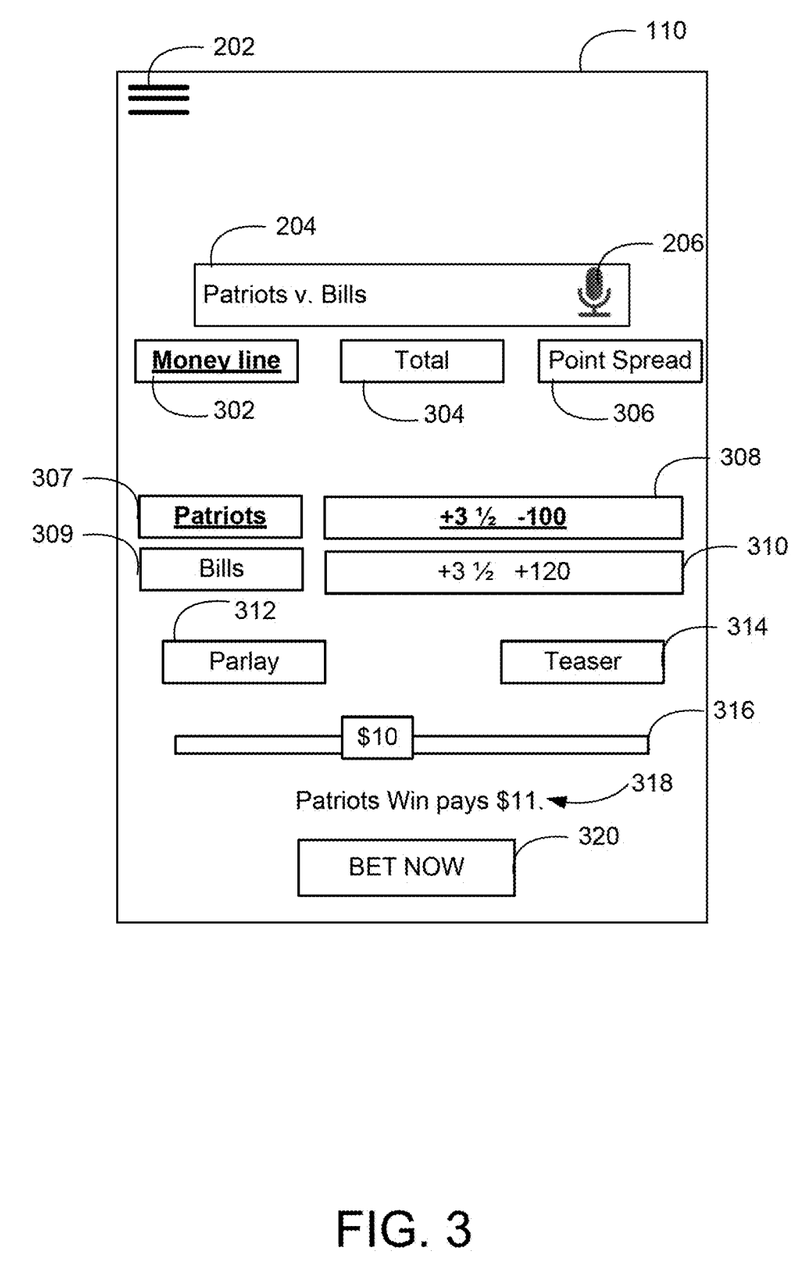
FIG. 3 is a schematic diagram of a graphical user interface according to some embodiments.

Upon searching or selecting a betting option from the trend cloud, in some embodiments the end user computing device may display options related to the selected bet. FIG. 3 illustrates an exemplary graphical user interface of the end user computing device 110 after the user selects "Patriots" from the trend cloud in FIG. 2 according to some embodiments. The menu button 202, search box 204 and microphone button 206 may remain, but now user interface items for specifying bet parameters may be displayed to the end user. For example, money line button 302, total button 304 and point spread button 306 may allow the user to select a particular way of betting on the results of the selected sporting event (in the example illustrated, the sporting event is a football game between the Patriots and the Bills). In this example case, the money line option is selected, but the user may use the buttons to select one of the other options if desired. The Patriots button 307 and the Bills button 309 may allow the end user to select which team he or she would like to bet on. In this case, the Patriots are selected. A Patriots odds box 308 and a Bills odds box 309 may show the user the odds associated with the bet. A parlay button 312 and a teaser button 314 may allow the end user to combine multiple individual bets. If the end user selects either button 312 or button 314, the end user may be given the option to find at least one other bet to combine with the first bet to make a parlay bet or a teaser bet. A slider 316 is provided in this example to allow the end user to select the amount of money that he or she would like to wager. The text 318 below the slider may display to the end user how much money will be payed out if the bet wins. A betting button 320 is located at the bottom of the exemplary screen. When the end user triggers the betting button 320, the bet may be sent from the end user computing device 110 to the bet-ranking engine 120.

Figure 4:
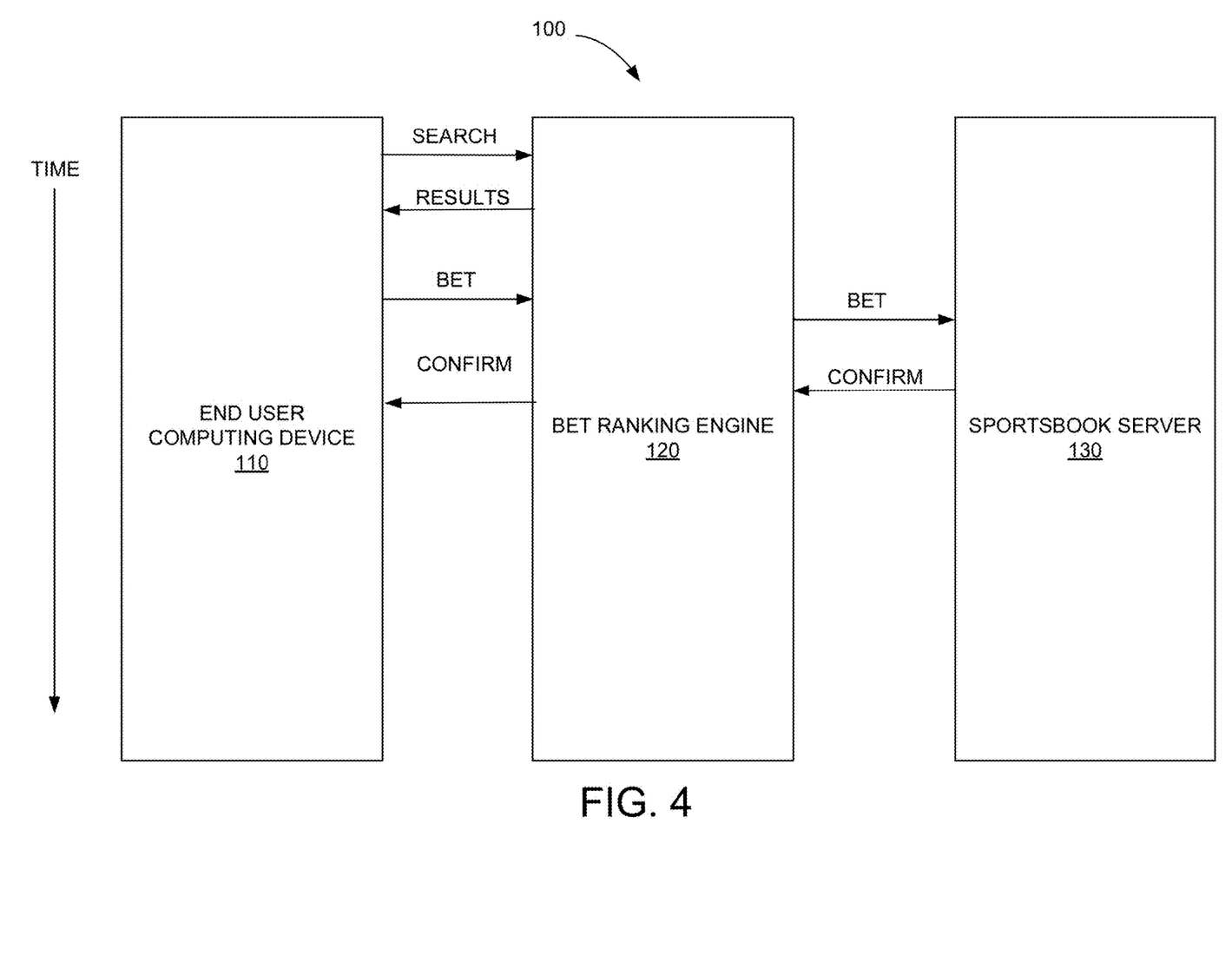
FIG. 4 is a block diagram showing communication between the components of the network environment according to some embodiments.

Exemplary interactions, according to some embodiments, between the components of the network environment 100 for the online sportsbook are illustrated in FIG. 4. In the example, the end user computing device 110 sends a search query to the bet-ranking engine 120. The bet-ranking engine 120 performs the bet-ranking algorithm and ranks at least a portion of the available betting opportunities of bets that the end user could make. A set of results, representing the highest ranking portion of the possible betting options, may be returned to the end user computing device 100. During this search phase of the interaction, in some embodiments the sportsbook server may not be involved in the case of a single bet.

When the end user selects a bet that he or she would like to place, in some embodiments the end user computing device may send the bet to the bet-ranking engine 120. The bet-ranking engine 120 may use the received bet information to update various input data stored in the database. At least a portion of the received bet information may then be transmitted to the sportsbook server 130 where the bet may be placed. The sportsbook server 130 may send a confirmation message to the bet-ranking engine 120, which may relay the confirmation to the end user computing device 110.

Figure 5:
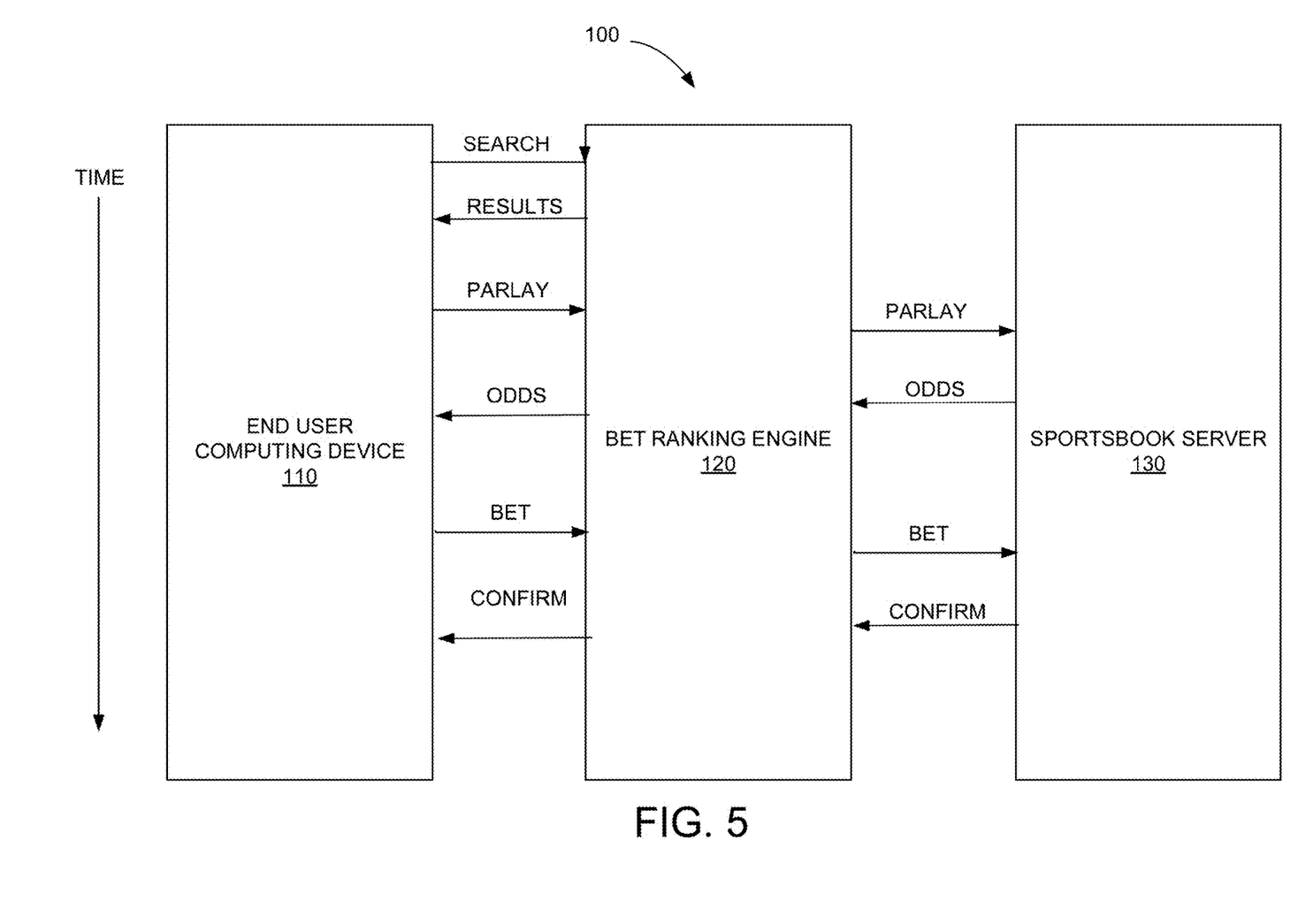
FIG. 5 is a block diagram showing communication between the components of the network environment according to some embodiments.

If a parlay bet or a teaser bet is placed, then the interaction in some embodiments may be more complicated. FIG. 5 illustrates exemplary communications within the network environment 100 when a parlay bet is being placed. As in FIG. 4, the end user may perform a search and the end user computing device 110 may receive ranked search results from the bet-ranking engine 120. Then, the end user may select more than one individual bet to form a parlay bet. In some embodiment, the bet-ranking engine may not determine the odds for a particular bet, which may be the province of the sportsbook server. The sportsbook server may convey the odds for an individual bet to the bet-ranking engine for storage in the database, but in some embodiments may not convey the odds for every possible parlay bet (e.g., as there may be an infinite number of parlay bets that may be placed). Accordingly, for the odds of the parlay bet to be determined and provided to the end user, the parlay bet information may be sent to the sportsbook server 130 in some embodiments. The sportsbook server 130 may use the parlay bet information to calculate the odds for the parlay bet. The odds may then be sent back to the bet-ranking engine 120, which may send the odds back to the end user computing device 110. In some embodiments, this may be when the end user may place the parlay bet, after seeing the odds for the complete bet. An indication that the end user placed the parlay bet may be sent to the bet-ranking engine. As in the case described above, in some embodiments at least a portion of the parlay bet information may be used to update the input data in the database. The parlay bet indication may then be sent to the sportsbook server 130, where the bet may be placed in some embodiments. A confirmation may then be sent back through the bet-ranking engine 120 to the end user computing device 110.

Figure 6:
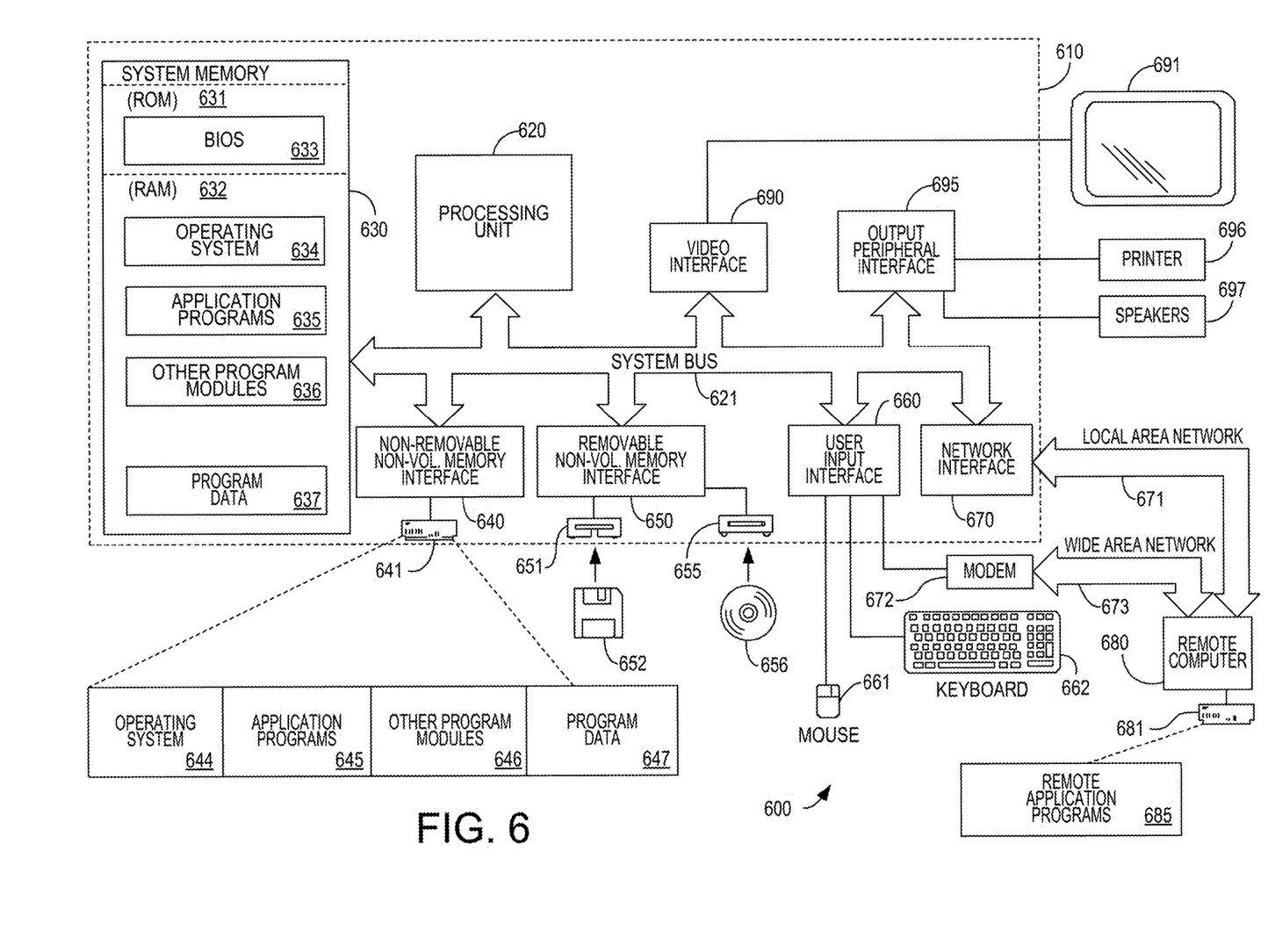
FIG. 6 is a schematic diagram of an exemplary computing environment in which some embodiments may be implemented.

FIG. 6 illustrates an example of a suitable computing system environment 600 in which some embodiments may be implemented. For example, the end user computing device 110, the bet-ranking engine 120 and/or the sportsbook server 130 may be implemented using one or more of the components shown in the computing system environment 600. This computing system may be representative of a computing system that allows a suitable control system to implement the described techniques. However, it should be appreciated that the computing system environment 600 is only one example of a suitable computing environment and is not intended to suggest any limitation as to the scope of use or functionality of the described embodiments. Neither should the computing environment 600 be interpreted as having any dependency or requirement relating to any one or combination of components illustrated in the exemplary operating environment 600.

Embodiments may be operational with numerous other general purpose or special purpose computing system environments or configurations. Examples of known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules may include routines, programs, objects, components, data structures, etc., that perform particular tasks or implement particular abstract data types. Embodiments may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing embodiments includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs at least the above-discussed functions. The computer-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., does not by itself connote any priority, precedence, or order of one claim element over another or the temporal order in which acts of a method are performed. Ordinal terms are used merely as labels to distinguish one element having a certain name from another element having a same name (but for use of the ordinal term), to distinguish the elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of facilitating online search for up-to-date available sports betting opportunities, the method comprising:
    maintaining, by a first computing device communicatively coupled to a computer-readable storage medium, a history of sports betting performed by a user in the computer-readable storage medium;
    maintaining, by the first computing device, a data feed of available sports betting opportunities with continuous updates in the computer-readable storage medium the data feed being associated with a third computing device that is communicatively coupled to the first computing device via a second communications network;
    receiving, at the first computing device, a first signal including a search query for available sports betting opportunities input by the user from a second computing device communicatively coupled to the first computing device via a first communications network;
    retrieving, at the first computing device, search results from the data feed representing up-to-date available sports betting opportunities in response to the search query;
    ranking, by the first computing device, at least a portion of the search results representing available sports betting opportunities based at least in part on the user's history of sports betting; and
    transmitting, by the first computing device, a second signal including the ranked available sports betting opportunities to the user at the second computing device over the first communications network in response to the search query.

2. The method of claim 1, wherein maintaining the data feed of available sports betting opportunities comprises maintaining updated data during an ongoing sports game regarding occurrence of events within the game, on which bets may be placed.

3. The method of claim 1, wherein maintaining the data feed of available sports betting opportunities comprises receiving from a third computing device private sportsbook data with continuous updates.

4. The method of claim 3, wherein the private sportsbook data comprises data selected from the group consisting of: data regarding odds for particular betting opportunities, data regarding point spreads for particular sporting events, data regarding bets placed by other users for particular betting opportunities, data regarding maximum wager amounts for particular betting opportunities, and data regarding minimum wager amounts for particular betting opportunities.

5. The method of claim 4, wherein the private sportsbook data is continuously updated based on users placing new bets.

6. The method of claim 4, wherein the ranking at least a portion of the search results representing available sports betting opportunities comprises applying a betting opportunity ranking algorithm that disfavors betting opportunities on which other users have already wagered.

7. The method of claim 4, wherein retrieving the search results comprises retrieving a first betting opportunity matching the search query, as well as a second betting opportunity on which wagers have been placed by other users who also bet on the first betting opportunity.

8. The method of claim 1, wherein maintaining the history of sports betting performed by the user comprises maintaining a history of types of betting opportunities searched for, selected, and/or bet on by the user, and wherein the ranking at least a portion of the search results representing available sports betting opportunities comprises applying a betting opportunity ranking algorithm that favors types of betting opportunities search for, selected, and/or bet on by the user as recorded in the history.

9. The method of claim 1, further comprising presenting different sets of ranked search results to different users in response to the same search query input by the different users.

10. A method of displaying customized up-to-date available sports betting opportunities to a user, the method comprising:
    receiving, at a first computing device operated by the user, a signal including a list of up-to-date available sports betting opportunities ranked based at least in part on a history of sports betting performed by the user, transmitted to the first computing device over a first communications network from a second computing device that maintains a data feed of available sports betting opportunities with continuous updates in a storage medium that is continuously updated at least once every ten seconds, the data feed being associated with a third computing device that is communicatively coupled to the second computing device via a second communications network; and
    displaying, by the first computing device, the ranked available sports betting opportunities to the user at the first computing device in a cloud formation emphasizing available sports betting opportunities that are highly ranked based at least in part on the user's history of sports betting.

11. The method of claim 10, wherein displaying the ranked available sports betting opportunities in the cloud formation comprises displaying the highly ranked available sports betting opportunities larger and/or in more prominent locations than less highly ranked available sports betting opportunities.

12. The method of claim 10, wherein the ranked available sports betting opportunities are displayed in the cloud formation without requiring the user to input a search query for available sports betting opportunities.

13. The method of claim 10, further comprising, in response to user input selecting a first available sports betting opportunity via the displayed cloud formation, allowing the user to place a bet on the first available sports betting opportunity.

14. A system comprising:
   at least one processor; and
   at least one storage medium storing processor-executable instructions that, when executed by the at least one processor, perform a method of facilitating online search for up-to-date available sports betting opportunities, the method comprising:
      maintaining a history of sports betting performed by a user in the at least one storage medium;
      maintaining a data feed of available sports betting opportunities with continuous updates in the at least one storage medium, the data feed being associated with a remote computing device that is communicatively coupled with the at least one processor via a second communications network;
      receiving a first signal including a search query for available sports betting opportunities input by the user from a client computing device over a first communications network;
      retrieving search results from the data feed representing up-to-date available sports betting opportunities in response to the search query;
      ranking at least a portion of the search results representing available sports betting opportunities based at least in part on the user's history of sports betting; and
      transmitting a second signal including the ranked available sports betting opportunities to the user at the client computing device over the first communications network as a response to the search query.

15. The system of claim 14, wherein maintaining the data feed of available sports betting opportunities comprises maintaining updated data during an ongoing sports game regarding occurrence of events within the game, on which bets may be placed.

16. The system of claim 14, wherein maintaining the history of sports betting performed by the user comprises maintaining a history of types of betting opportunities searched for, selected, and/or bet on by the user, and wherein the ranking at least a portion of the search results representing available sports betting opportunities comprises applying a betting opportunity ranking algorithm that favors types of betting opportunities searched for, selected, and/or bet on by the user as recorded in the history.

17. The system of claim 14, wherein, the method further comprises presenting different sets of ranked search results to different users in response to the same search query input by the different users.

18. The system of claim 14, wherein maintaining the data feed of available sports betting opportunities comprises receiving from a server computing device private sportsbook data with continuous updates.

19. The system of claim 18, wherein the private sportsbook data comprises data selected from the group consisting of: data regarding odds for particular betting opportunities, data regarding point spreads for particular sporting events, data regarding bets placed by other users for particular betting opportunities, data regarding maximum wager amounts for particular betting opportunities, and data regarding minimum wager amounts for particular betting opportunities.

20. The system of claim 19, wherein the ranking at least a portion of the search results representing available sports betting opportunities comprises applying a betting opportunity ranking algorithm that disfavors betting opportunities on which other users have already wagered.

\* \* \* \* \*